United States Patent [19]
Armstrong

[11] Patent Number: 5,855,002
[45] Date of Patent: Dec. 29, 1998

[54] ARTIFICIALLY INTELLIGENT NATURAL LANGUAGE COMPUTATIONAL INTERFACE SYSTEM FOR INTERFACING A HUMAN TO A DATA PROCESSOR HAVING HUMAN-LIKE RESPONSES

[75] Inventor: Alan A. Armstrong, Cushing, Tex.

[73] Assignee: Pegasus Micro-Technologies, Inc., Allen, Tex.

[21] Appl. No.: 661,433

[22] Filed: Jun. 11, 1996

[51] Int. Cl.[6] .................................................. G10L 9/00
[52] U.S. Cl. ............................................ 704/270; 704/275
[58] Field of Search ................................... 395/2.79, 2.84, 395/2.86; 364/419.07; 379/88; 704/270, 275, 277

[56] References Cited

U.S. PATENT DOCUMENTS

| | | | |
|---|---|---|---|
| 4,688,195 | 8/1987 | Thompson et al. | 364/300 |
| 4,920,499 | 4/1990 | Skeirik | 364/200 |
| 4,965,741 | 10/1990 | Winchell et al. | 364/513 |
| 5,083,268 | 1/1992 | Hemphill et al. | 395/12 |
| 5,239,617 | 8/1993 | Gardner et al. | 395/12 |
| 5,282,265 | 1/1994 | Rohra Suda et al. | 395/12 |
| 5,333,237 | 7/1994 | Stefanopoulos et al. | 395/12 |

*Primary Examiner*—David R. Hudspeth
*Assistant Examiner*—Susan Wieland
*Attorney, Agent, or Firm*—Locke Purnell Rain Harrell

[57] ABSTRACT

A system for interfacing a human user to a data processor which receives inputs from the user and includes associated storage resource information. The data processor generates outputs to the user and associated output devices. The interface system includes structure for receiving a statement generated by the human user in natural language on a word-by-word basis. The system analyzes the statement to identify a subject and object and searches the stored resource information for data related to the identified subject. Output devices are provided for generating to the user the data from the stored resource information related to the identified subject.

8 Claims, 16 Drawing Sheets

5,855,002

ARTIFICIALLY INTELLIGENT NATURAL LANGUAGE COMPUTATIONAL INTERFACE SYSTEM FOR INTERFACING A HUMAN TO A DATA PROCESSOR HAVING HUMAN-LIKE RESPONSES

TECHNICAL FIELD OF THE INVENTION

The present invention relates to computer interfaces, and more particularly, to a natural language interface designed to interface and to share learned data between itself and any data base and which is designed to interface to human users and electronic devices or systems.

BACKGROUND OF THE INVENTION

Electronic and computer devices have been traditionally difficult to operate because of long, difficult to remember, command sequences. Natural language interfaces have been suggested to assist computer use; however, these interfaces are deficient in that they do not cover all grammar expressions and the user is unaware of the subset of natural language which the interface does cover. Users enter entire sentences only to find that the system cannot understand these sentences. Furthermore, such interfaces do not cover certain linguistic capabilities. Therefore, existing natural language interfaces are typically limited to single word commands for controlling simple and specific designed computer functions.

A need has thus arisen for an interface that is highly efficient, natural language, multi-lingual, linguistically programmable, artificial language acquisition device to learn new tasks and to share learned data between itself and other data bases which is designed to interface humans to electronic devices or systems. Such an interface must operate on natural human sentence structure and commands to enable use by operators who are not familiar with computer operations.

SUMMARY OF THE INVENTION

In accordance with the present invention, a system for interfacing a human user to a data processor is provided. The data processor receives inputs from the user and includes associated storage resource information. The data processor generates outputs to the user and associated output devices. The interface system includes structure for receiving a statement generated by the human user in natural language on a word-by-word basis. Structure is provided for analyzing the statement to identify a subject. Structure is further provided for searching the stored resource information for data related to the identified subject. Output devices are provided for generating to the user the data from the stored resource information related to the identified subject.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
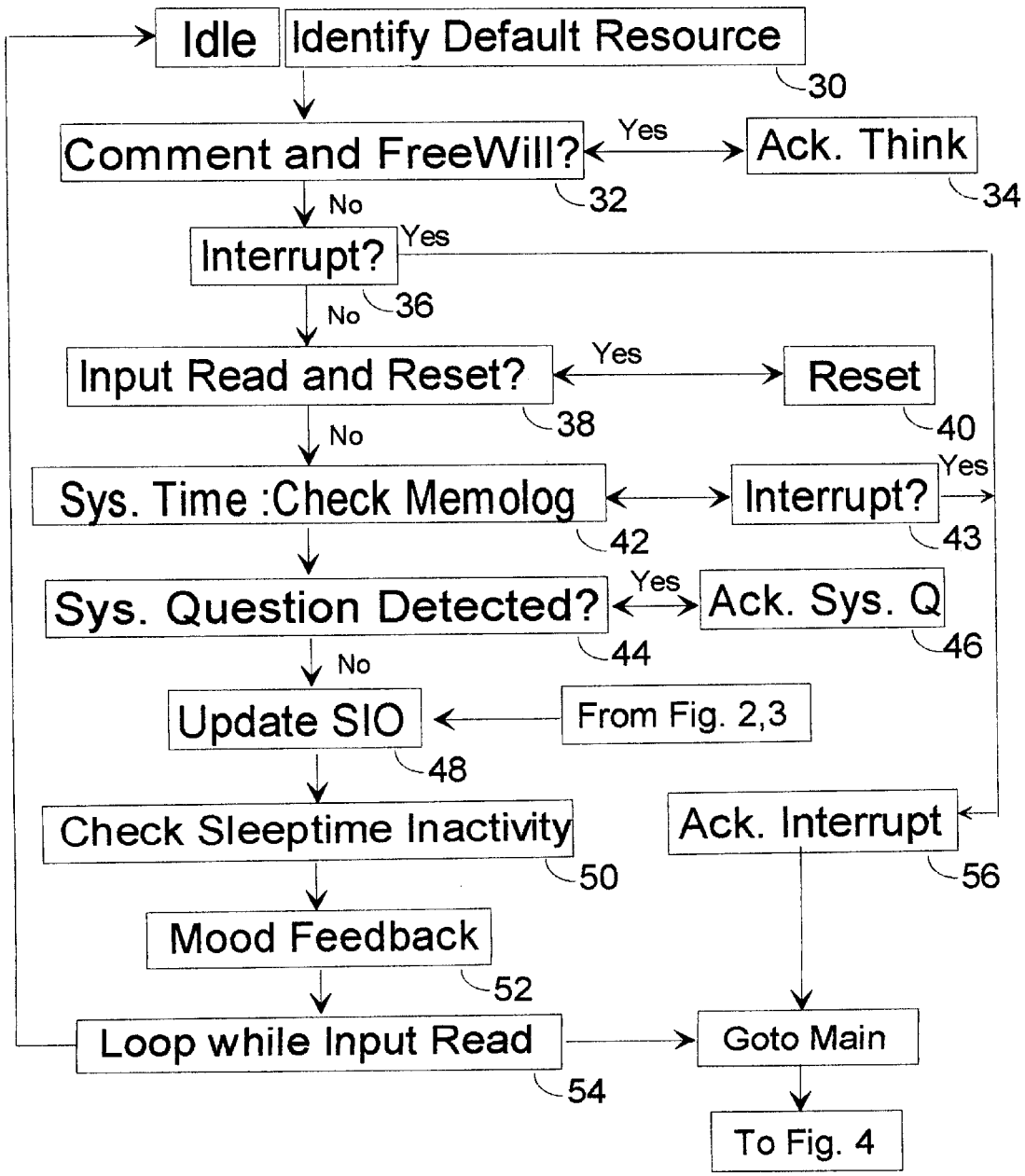
FIGS. 1–14 are software flow diagrams illustrating the present interface system.

Referring simultaneously to FIGS. 1–14, the present interface system is illustrated in the form of a computer flow diagram. Each figure is generally arranged to illustrate a specific function within the present interface system. Each function or module is illustrated in a single figure and identified as follows:

| Figure Number | Module Function |
| --- | --- |
| 1 | Idle |
| 2 | Output |
| 3 | Output/Register Write |
| 4 | Main |
| 5 | Register Read |
| 6 | Fetch |
| 7 | No Command |
| 8 | Subject OK |
| 9 | Latch |
| 10 | Engine |
| 11 | Summary |
| 12 | Global |
| 13 | Equality |
| 14 | Trace |

The figures and module function are shown for illustrative purposes only, and are not intended to restrict the present invention to the module functions or functional divisions within the present interface. The present interface system provides for a dynamic parallel processor interface for a natural language programmable, artificial language acquisition device and provides for a cybernetic intelligence with robotic ability to learn new tasks and to share learned data between itself and data bases. The system is designed to interface humans and electronic devices or systems utilizing RS 232 serial input/output busses or communication ports. Various types of inputs can be utilized with the present interface system such as, for example, voice recognition, keyboard, dictation devices, and communication devices. Characteristic of all usable input devices with the present invention is that the input is in the form of ASCII. Voice recognition units perform analog to digital conversion to convert spoken words into recognizable digital signals usable by a central processing unit. The present interface system is particularly adapted for use with voice recognition devices for interfacing a central processing unit or computer to a human user providing verbal inquiries and instructions to a central processing unit. The output of the central processing unit may comprise, for example, text to speech synthesizers for converting digital signals to recognizable words; digital controllers and robotic devices for performing machine control functions. Such functions may include the operation of a photocopy machine, or any device which receives ASCII commands. The present system interface operates with a processor that receives inputs from external data resources supplied on various memory type devices, including hard drives, floppy discs, and other electronic memory devices. The processor also interfaces to a display for displaying user commands and information to the system user.

The present interface system synchronously derives input from the external environment, such as, for example, a human speaking in natural languages, omits non-essential verbiage, identifies descriptors by tables, and develops an operation directed to the remaining words or objects. The system synchronously derives output from the system environment and internal feedback from programmed or direct commands. The system asynchronously inputs and outputs through I/O or COM ports.

The system includes an idle module (FIG. 1) that controls basic system functions. The idle module monitors system I/O functions of FIGS. 2 and 3. After an output update (FIG.

Figure 4:
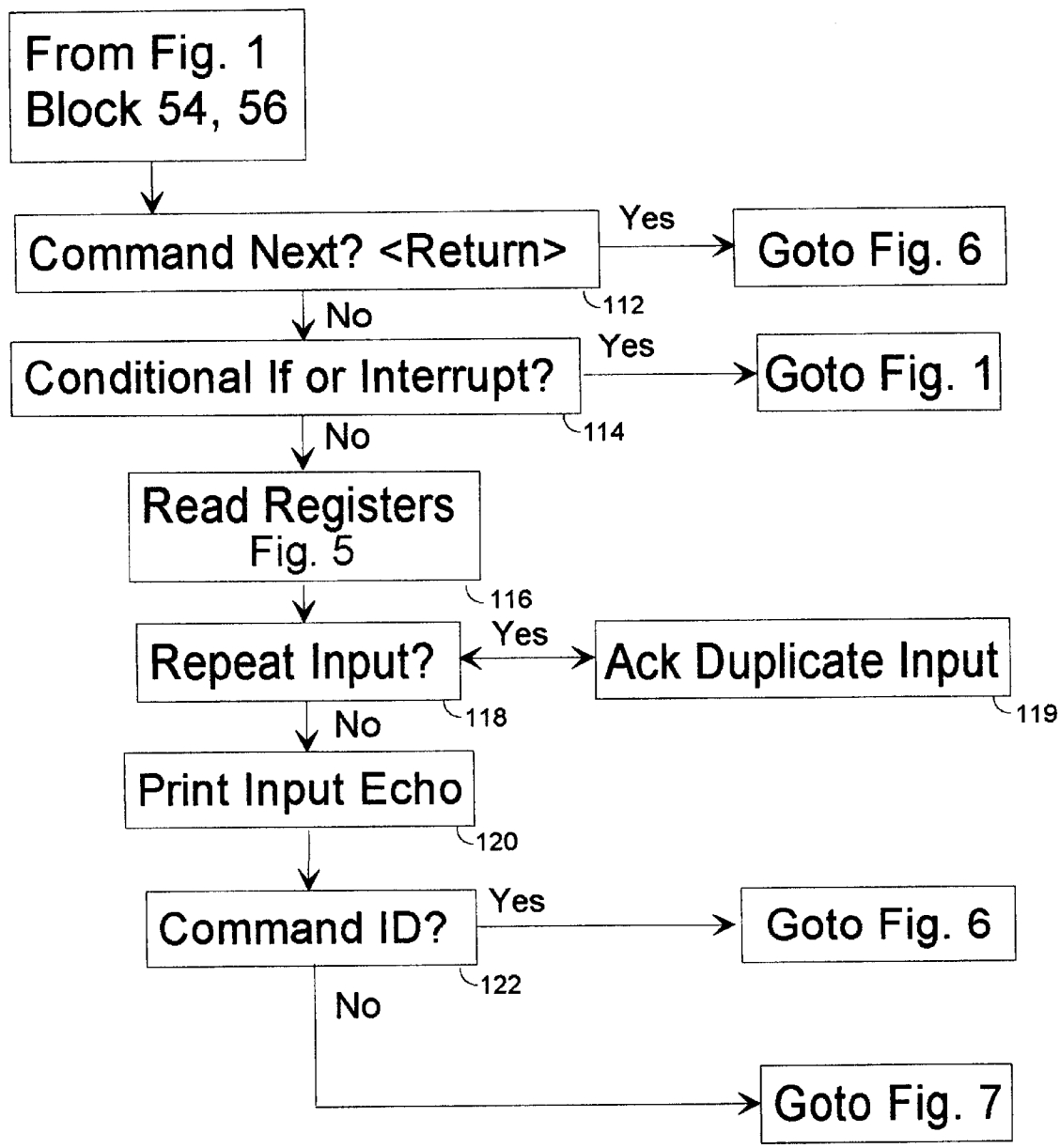
Figure 5:
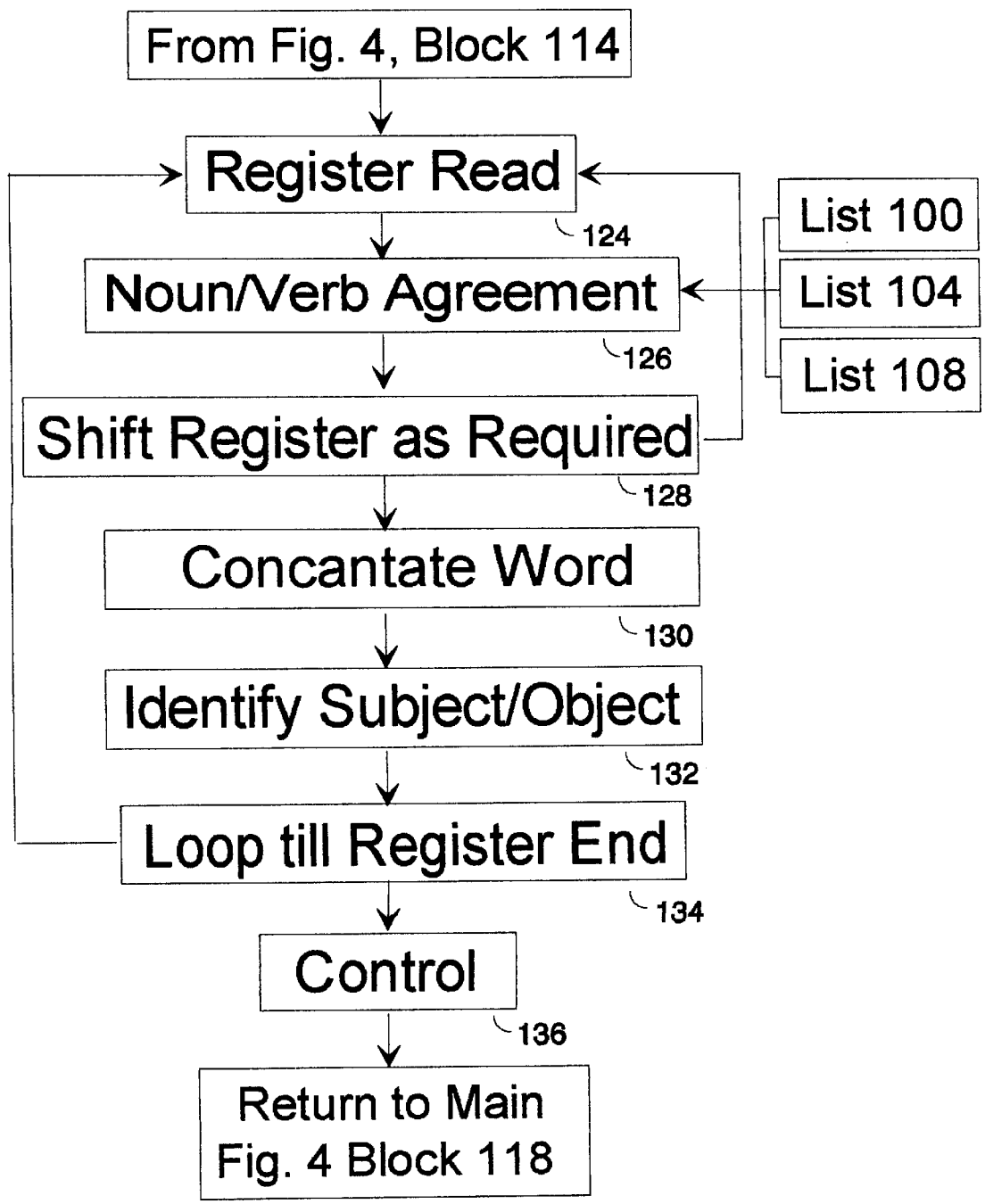

2) the idle module checks for input from external input devices. If no input is found, the idle module returns to the idle function. The idle module essentially loops between the functions of FIGS. 1, 2, and 3 if there are no inputs. The input module of FIG. 3 functions to receive input such as, for example, human voice instructions in which the system registers begin to record the words as they are input, separated by the pauses in voice or a space bar on a keyboard generating ASCII code. As the registers fill up, the system performs a return for indicating the end of an input sequence. When the end of the input sequence occurs, the idle module (FIG. 1) understands that input has been made into the system. The idle module immediately acknowledges this input and drops out of the idle sequence and goes into the main module of FIG. 4. When input is channeled to the main module, determinations are made as to whether a command or no command is present. At the time of input, commands are automatically recognized. The system analyzes each word as it is spoken or input from an ASCII input device which is the reason why the input module (FIG. 3) determines such elements as root word, contraction, and pronoun within an input spoken sentence. FIG. 5 illustrates the register read module which is called by the main module.

Figure 6:
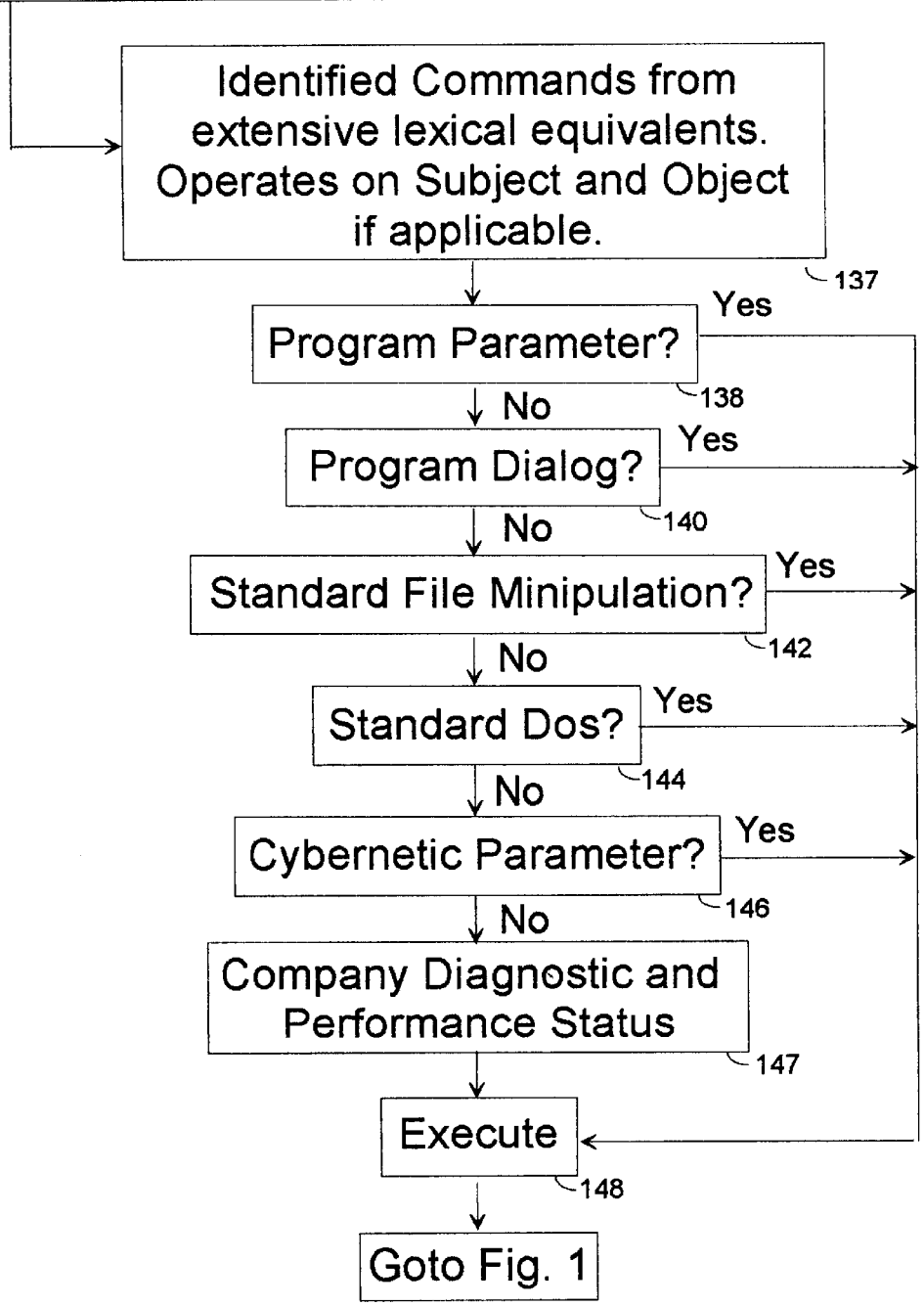

The main module (FIG. 4) determines if a command is present and proceeds to the fetch module (FIG. 6). Fetch commands may include, for example, instructions to fetch a file, perform a print operation and other standard file procedures. In the event no command is present, the flow continues to FIG. 7, the no command module. With the detection of no command, the system operates to determine whether a subject has been detected from the input information. Subject detection is performed primarily by means of elimination. The no command module (FIG. 7) performs various operations to determine if a subject has been detected from the input.

Figure 8:
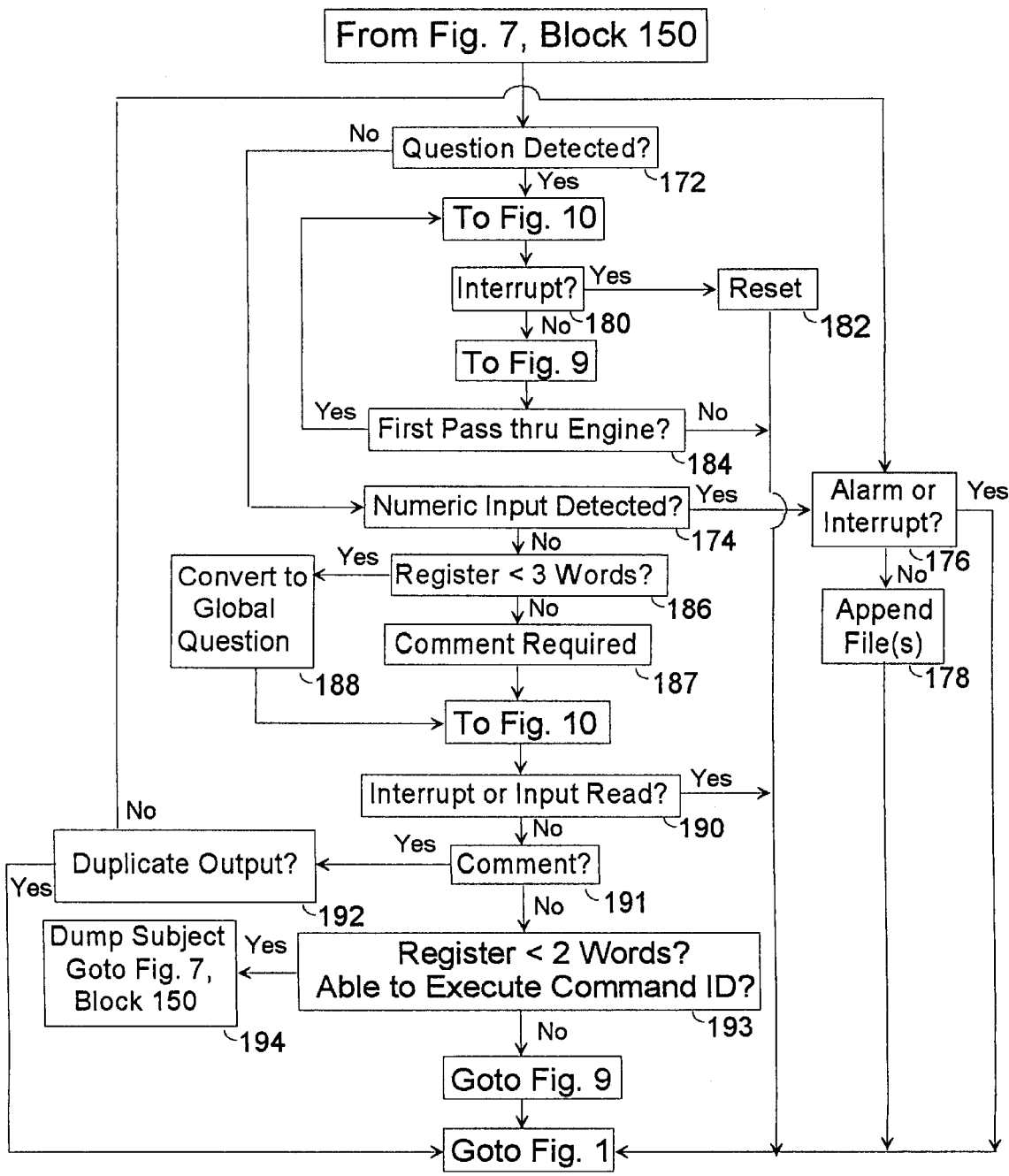

Assuming a subject has been detected, the interface system proceeds to FIG. 8 to determine whether a question has been detected. With the detection of a question, the interface system proceeds to FIG. 10 which is the system engine. Various files within the system are checked which include first person, which is the system itself, second person, which is the user's file, and third person, which is the outside world environment. The engine module looks to determine whether there is a match of a questioned word as well as to determine if there is a focal point of the input conversation. This focal point is referred to as the object. If the interface system finds the object, the engine module will be exited and the flow returns to FIG. 8.

Figure 12:
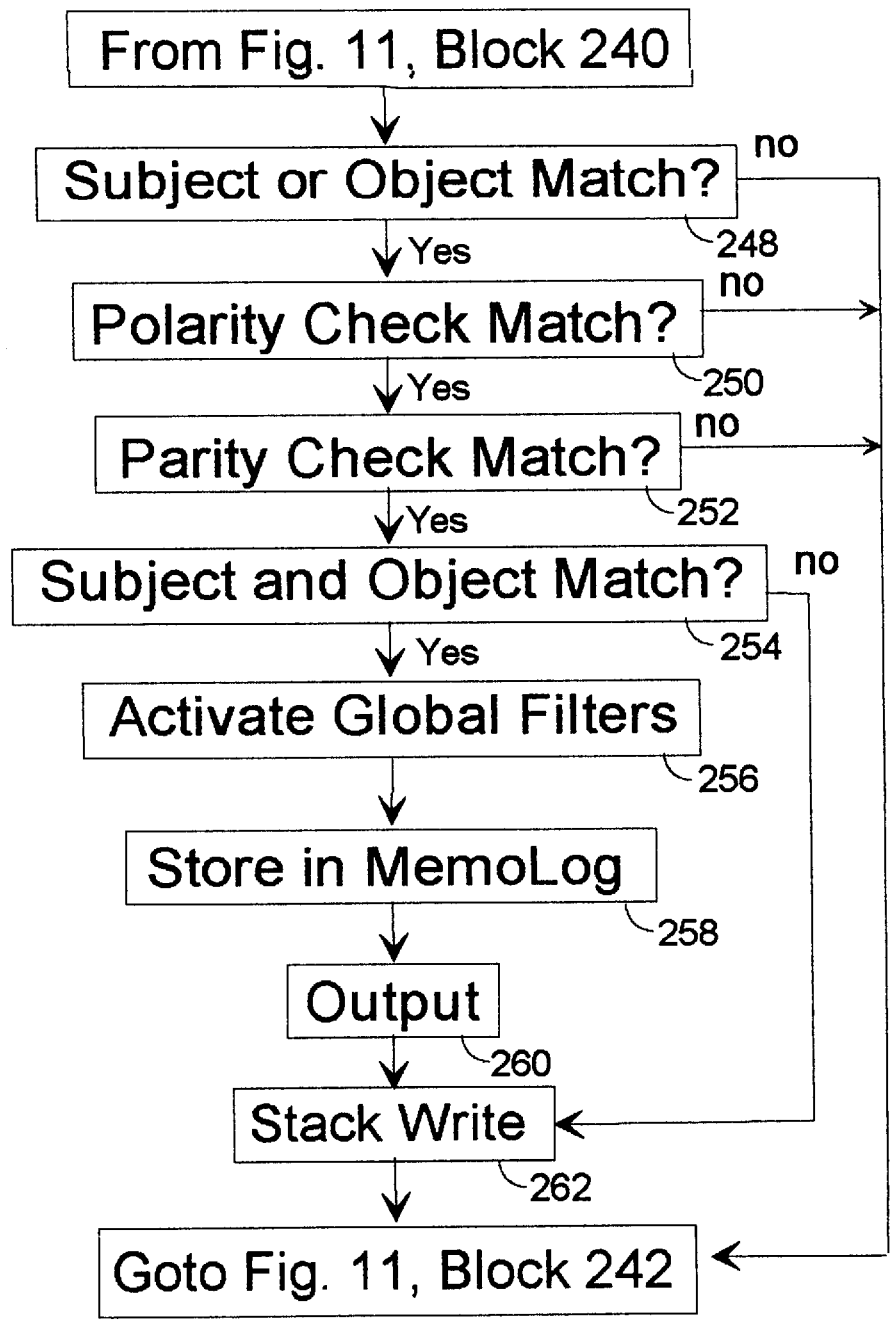
Figure 13:
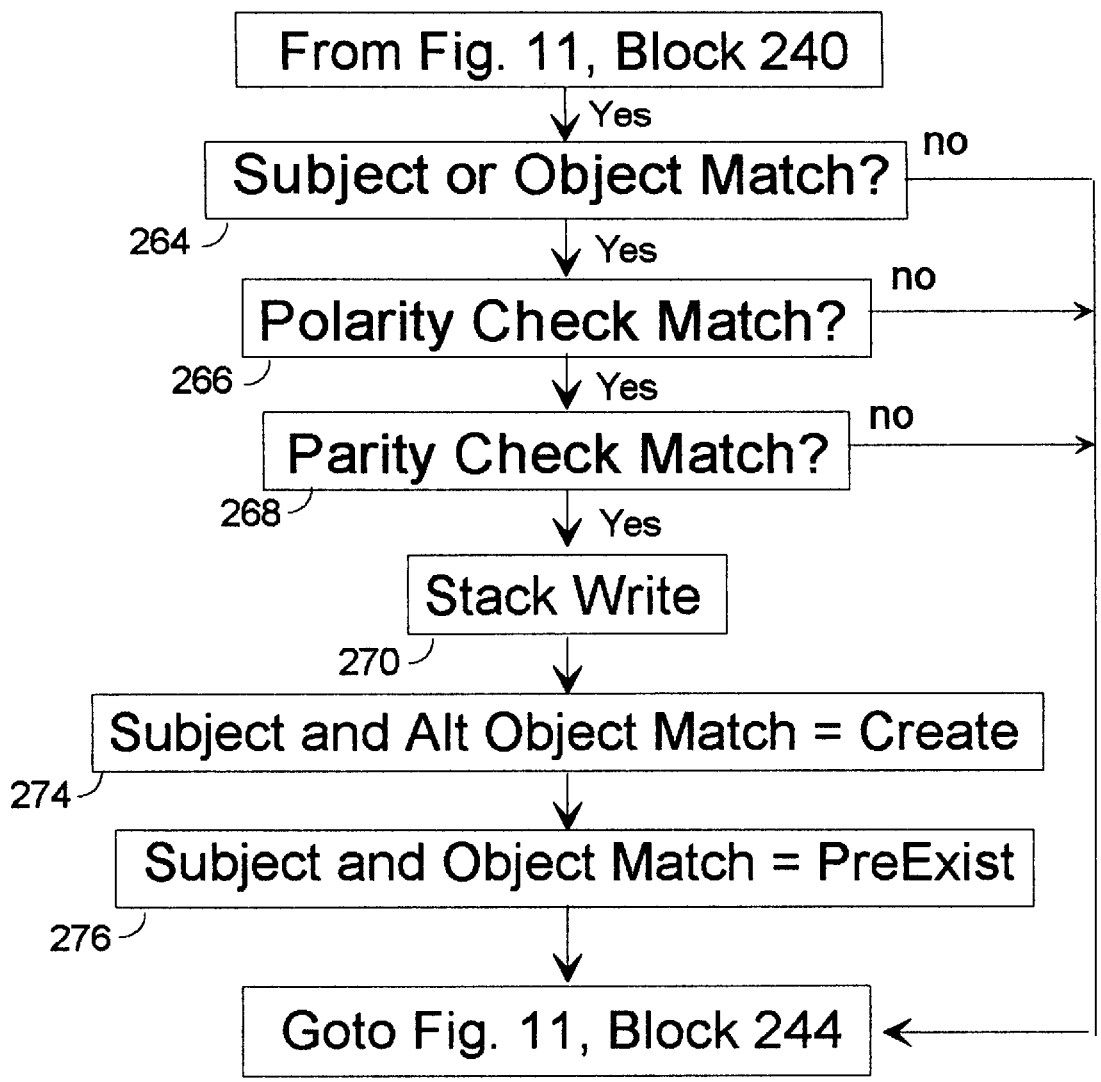

In the event the engine module does not find the subject, two additional searches are made by the present system, global (FIG. 12) and equality (FIG. 13). If the input is of a global type question, the system determines whether there is a subject and object match. This determination is made through operation of modules of FIGS. 11 and 12. The equality module of FIG. 13 determines whether the input is an inference question.

Figure 11:
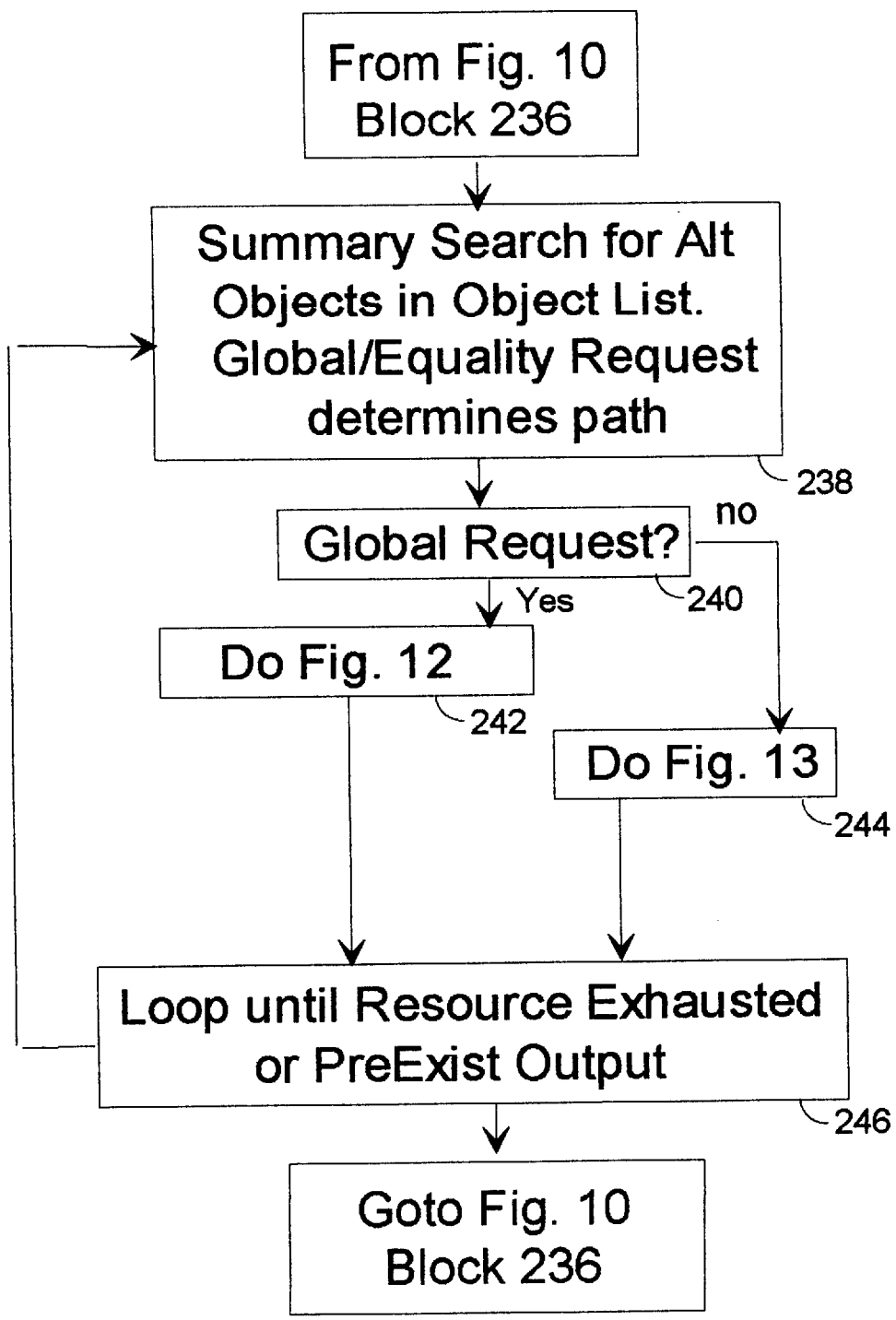

After the functions of the module shown in FIGS. 11, 12, or 13 has been formed, the summary search function is complete and the flow returns to FIG. 8 after a subject has been located. With material having been found based upon the input, the system performs a latch function in FIG. 9. If a pre-existing output has been located within the latch module, the information will be applied to a file either the system's file, the user's file, or the third person's file. Within the latch module, additional resources are reviewed to respond to input inquiries.

The trace module (FIG. 14) is called by any of the other modules within the system and performs system updates including system internal characteristics, including animation and system "blood pressure" and "heart beat rate". The trace module (FIG. 14) performs display updates to alert a user of system parameters and ongoing functions.

Referring now specifically to FIG. 1, the idle module, the system enters the idle module at block 30 and proceeds to the comment and free will block 32. Block 32 obtains an equality question and functions to read the default resources and to develop equality or global questions based on the status of the object and subject. As used herein, "object" is the object of the discourse, the particular subject or key element of the sentence. The subject is similar to an adjective or an adverb and may include primary or secondary descriptors. In the event of more than two objects within a sentence, parity and polarity checks are made within the system. Block 32 develops whether the question is an equality or global question. A global question means that the subject and the object of the sentence are identical. As will subsequently be described, the questions are developed from the system resource data files. The system will generate questions to the user at block 34, acknowledge think. Acknowledge thinly block 34, triggers an interrupt at block 36. Block 32 allows the system to develop equity or global questions based upon resource libraries available to the system.

Input read and reset block 38 determines whether the system has performed a print or output operation. If such an operation is performed, a reset function is performed at block 40. After the system is reset, the system returns to block 38. A check is made at block 42, system time, to determine if there is any information in the memo log which is to be displayed. The memo log contains a current memo of the most current and most recent material input by the user. If the memo log contains material to be output, an interrupt is created at block 43.

At block 44 a determination is made as to whether the interface system has raised a question to the user in order to clarify a request the user has made. Information learned by the system from various resources are utilized to frame an output to the user requested additional information. The user acknowledges the system question at block 46. The user may nor may not acknowledge the system question. The next operation within idle module (FIG. 1) is an update of system input/output at block 48. Block 48 receives inputs from the output and input modules, FIGS. 2 and 3, respectively. Block 50 operates to determine whether any input has been received over a period of time. If no input has been received, the system proceeds to an inactive mode. Block 52 relates to the system mood feedback, the human characteristics of the system interface such as, for example, heartbeat and blood pressure. The idle module loops while input is read in a feedback loop. The loop terminates based upon an acknowledged interrupt at block 56 or an input read to proceed to the main module (FIG. 4).

Figure 2:
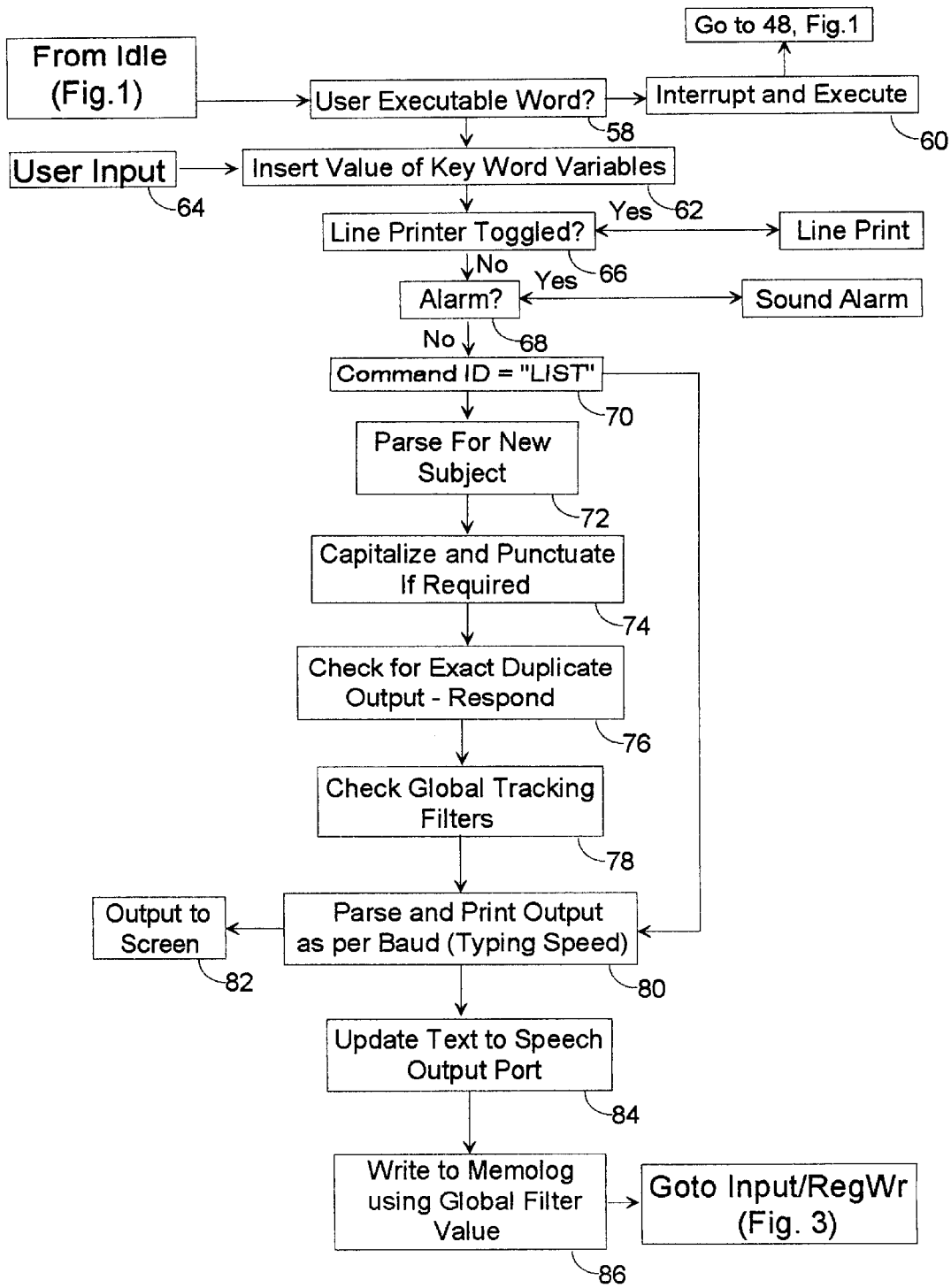

Referring now to FIG. 2, the interface system enters the output module either from an interrupt generated in the idle module (FIG. 1) or from a user input. A user executable word at block 58 determines that the output contains the word "means" for identifying a response to a given instruction from the user. The next time the instruction appears, interrupt and execute at block 60 will be performed in order to accomplish the command. The flow then returns to block 48 (FIG. 1). For example, when the user says "ABC means turn on the coffee pot", when this information is input to the system, the system recognizes the word "means" to file an executable command. The next time that the instruction appears, ABC will result in an output generated by the system to turn on the coffee pot.

Continuing with FIG. 2, value of key word variables are inserted at block 62. Such functions as adding to variables are performed to generate a result. Input of the variables come from a user input at block 64. Input may also be performed from an arithmetic logic unit input into block 62. At block 66 an inquiry is made as to whether a line printer has been toggled. If yes, a line print is performed on an output printer. An alarm 68 is triggered by an error in input, actuation of the alarm results in a sound output at sound alarm. At block 70, a command overrides all other commands as far as an output in order to generate a file output. The instruction "list" spoken by the user results in a file list.

At block 72, the systems parses for a new subject. This subject is contained within the sentence that diverges from the current subject. If there is a divergence, the system does a register shift so that the subject now becomes a new object and the old object is discarded. At block 74, a determination is made if capitalization and punctuation is required in the sentence being input. At block 76, a determination is made as to whether the input is a duplicate. Block 78 checks for global tracking filters. These filters are words that are identified with who, what, when, where, and why. The global filters keep track of whether or not the input information is about a person, place, or thing. These filters are stored as resources as library files for the system. At block 80, an output is generated to an output screen at block 82. The output screen 82 may comprise, for example, a display screen, or output device which utilizes the system output. At block 84, the text to speech output port is updated. At block 86, a write to the memo log is performed using the global filter. For example, the statement "My meeting is at 3:30" instructs the system to use the word "at" as the global filter and the time as key indicators to be referenced as a point or location within the memo log.

Figure 3:
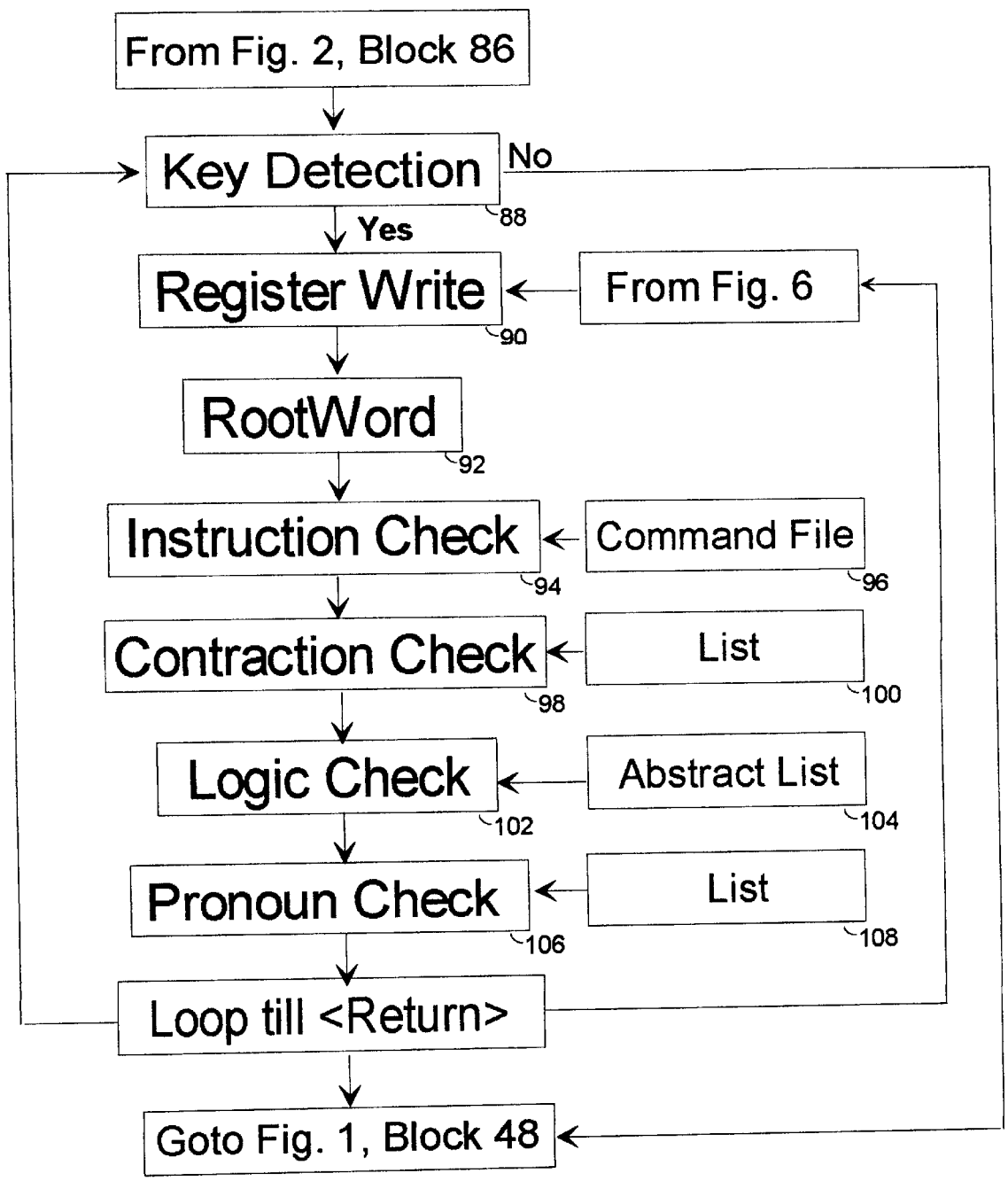

Referring now to FIG. 3, after printing an output, the interface system determines whether a key has been actuated at block 88. This actuation of a key is in the form of an input either from a user keyboard or an input on a communication port. If no input detection has occurred, the system returns to FIG. 1, block 48.

If an input has been detected, input is made to register write 90. This register accumulates letters or characters and operates like a central processing shift register. What will trigger the shift register to shift, is a space on the input. Immediately upon the detection of a space on the entry of the first word at block 92, the system checks to determine what the root word is. At block 92 suffixes that are associated with words are removed. At block 94, an instruction check is performed on the root word. The system performs an instruction check and looks through the instruction command file 96 to determine if the word is some type of command, a standard computer instruction such as "get", "fetch", "find a file", or "find new", all of which words are listed in the command file 96. If the root word is not a command, the system determines whether the word is a contraction at block 98. A contraction list is contained in file 100 and includes such words as "can't", "don't", "isn't", or "wasn't". At block 102, a logic check is made on the word. This check is made against an abstract word list block 104. Abstract list 104 includes various words that have nuances which are not direct nouns. These words are abstracts that function in conjunction with the object. Next a pronoun check is made at block 106 against a list of pronouns at block 108. Upon the detection of an instruction, contraction, logic or pronoun, various switches are set within the system. These switches are set at the time of entry of words through a keyboard. The analysis of the words is made between keystrokes so that as soon as the space bar is actuated, the system analyzes the word and sets the appropriate switches.

Assuming that the word has passed through block 106 and has not triggered any of the system switches, the program continues to the fetch module (FIG. 6). If all words have been detected with the ending of an input sentence, the system returns to block 48 (FIG. 1).

Referring now to FIG. 4, the main module is called from FIG. 1, block 54 or 56. At block 112, a determination is made as to whether the command is a return. If the command is a return, the flow continues to the fetch module (FIG. 6). At block 114, if the command was not a return, a decision is made as to whether a conditional "if" or interrupt has occurred. The determination is made to identify conditions that are preceded by the word "if". The system will check to determine if the condition is true or false. If the condition is true, a command will be executed. If the condition is false, a command will be generated as to output a question "why not". The system will then return to block 48 (FIG. 1). The system then returns to the idle module to acknowledge if an interrupt has occurred.

At block 116, registers are read from the register read module (FIG. 5). Assuming that the input was not a "if" condition that has been satisfied and needs to be executed, the next step is to read the sentence that has been written into the register. The words were read in the input module (FIG. 3) as the words were spoken. The entire sentence is now structured, or restructured to appear syntactically from the system point of view. The words of the sentence are input from the idle module to the main module.

Figure 7:
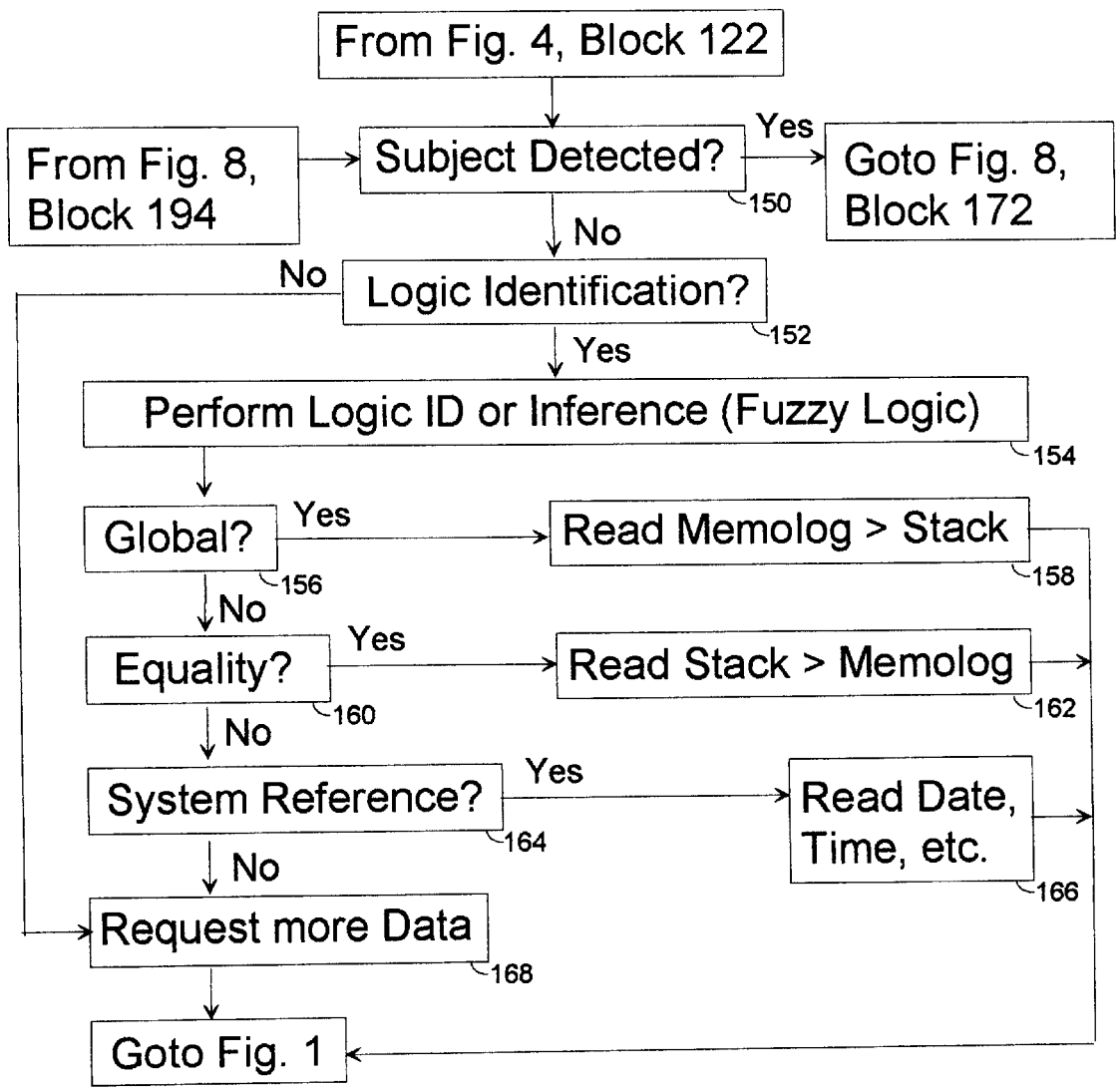

At block 118, the system determines whether the input is a repeat input, whether the request is redundant. If yes, the system acknowledges that the input was duplicate at block 119. At block 120, a determination is made as to whether the input is an input echo. The input may not be an exact duplicate input; however, it may appear to the system as being the same input. At block 122, the system looks for a direct command. Any of the command words on the command list are to be identified. The switches may have already been set from the operation of FIG. 3 if a command was determined. If a direct command is detected, the system proceeds to the fetch module (FIG. 6). If the input is not an instruction, there was no command detected, the system proceeds to the no command module (FIG. 7).

Referring now to FIG. 5, the register read module which is entered from block 114, FIG. 4, block 124, register read is a register write in reverse. This register looks for nouns/verb agreement and in particular with regard to first and second persons. The register changes the sentence to proper syntax with regard to the verbs that are identified and the nouns that are identified using the same lists, 100, 104, and 108 at block 126. Shift registers 128 are utilized if necessary to rearrange the subject/verb orders to arrive at the correct syntax of the sentence. After the syntax has been corrected, the system concatenates words at block 130 to add corrected words to the sentence as the sentence is developed. At block 132, the subject/object is identified. If the words have not been identified by a switch previously set, the system working by process of elimination must identify the word either as an adjective or an object to the sentence. If the word has not been found, the word is identified as both the subject and the object. The system then loops at block 134 to register read block 124.

The module of FIG. 5 is continuously looped until a sentence is built. The sentence is rearranged, compacted, and is in the form of a complete sentence with the end of the register being reached and no more words for the particular sentence. At block 136, the control block recognizes idiosyncrasies in the English language and the system returns to main module, block 118 with a completed syntactical sentence. The function of register read module (FIG. 5) functions to format questions into statements such that the system can then utilize resources to locate information to respond to the question. The conversion of the question to a statement for analysis by the system is a unique aspect of the present interface system for accessing resource files.

Referring now to FIG. 6, the fetch module of the present interface system is illustrated. The fetch module is accessed from blocks 112 and 122 of FIG. 4. The fetch module performs standard file manipulation procedures, program parameters that can be altered, and standard dialog manipulations within the system which the user is capable of verbally changing by a command. Such a command can include, for example, the word "DOS" in order to instruct the system to exit to a DOS command, or to provide a DOS prompt to enter a DOS system. These commands are identified at block 137. Program parameters are determined at block 138. A program parameter may include, for example, an output screen color. The command in that instance may be to "Change the color of the screen to red". At block 140, a program dialog command is detected which may include instructing the system to count. At block 142, standard file manipulation commands are detected such as "get a file", "display a file", "dump a file". At block 144, standard DOS commands are identified for file manipulation techniques converted to a lexicord. Cybernetic parameters include system humanistic characteristics to be changed are detected at block 146. At block 147, company diagnostic and performance status are detected which include visual displays. Upon the detection of either the program parameters, cybernetic parameters, or company diagnostics, the command is executed at block 148 and the system returns to the idle module, FIG. 1.

At this point in the operation of the present interface system, direct commands have been acted upon, input sentences have been structured for use by the system. This manipulation has occurred at the time of input. If no command or sentence has been identified, the input question is either a global or an equity type of question. The problem to be determined is whether a subject exists in the input.

Referring now to FIG. 7, if no command was identified at block 122 (FIG. 4), the no command module is entered at block 150 to determine if a subject can be detected. If a subject is detected, the no command module is exited to block 172 at FIG. 8. If no subject is detected, logic identification is performed at block 152. Logic identification is similar to that performed in input/register write module (FIG. 3) dealing with contractions, logic and pronoun checks utilizing the lists 100, 104, and 108. At block 154, a logic identified or inference analysis is performed. If no logic identification was performed at block 152, the system progresses to request more data at block 168. After the logic ID or inference analysis is performed, the inquiry is to determine whether the question is a global question at block 156. If the question is a global question, the memo log is read at block 158. If the question is an equality question determined at block 160, the memo log is read at block 162. If the question relates to a system reference at block 164, the date, time and other system parameters are read at block 166. If the question is neither a global, equity, or system reference, more data is requested at block 168, and the system returns to the idle module, FIG. 1.

The no command module (FIG. 7) operates to extract whatever information can be obtained from the sentence structure using memo logs and stacks within the computer which is being interfaced by the present interface system. The stack includes temporary clipboards of information.

Figure 10:
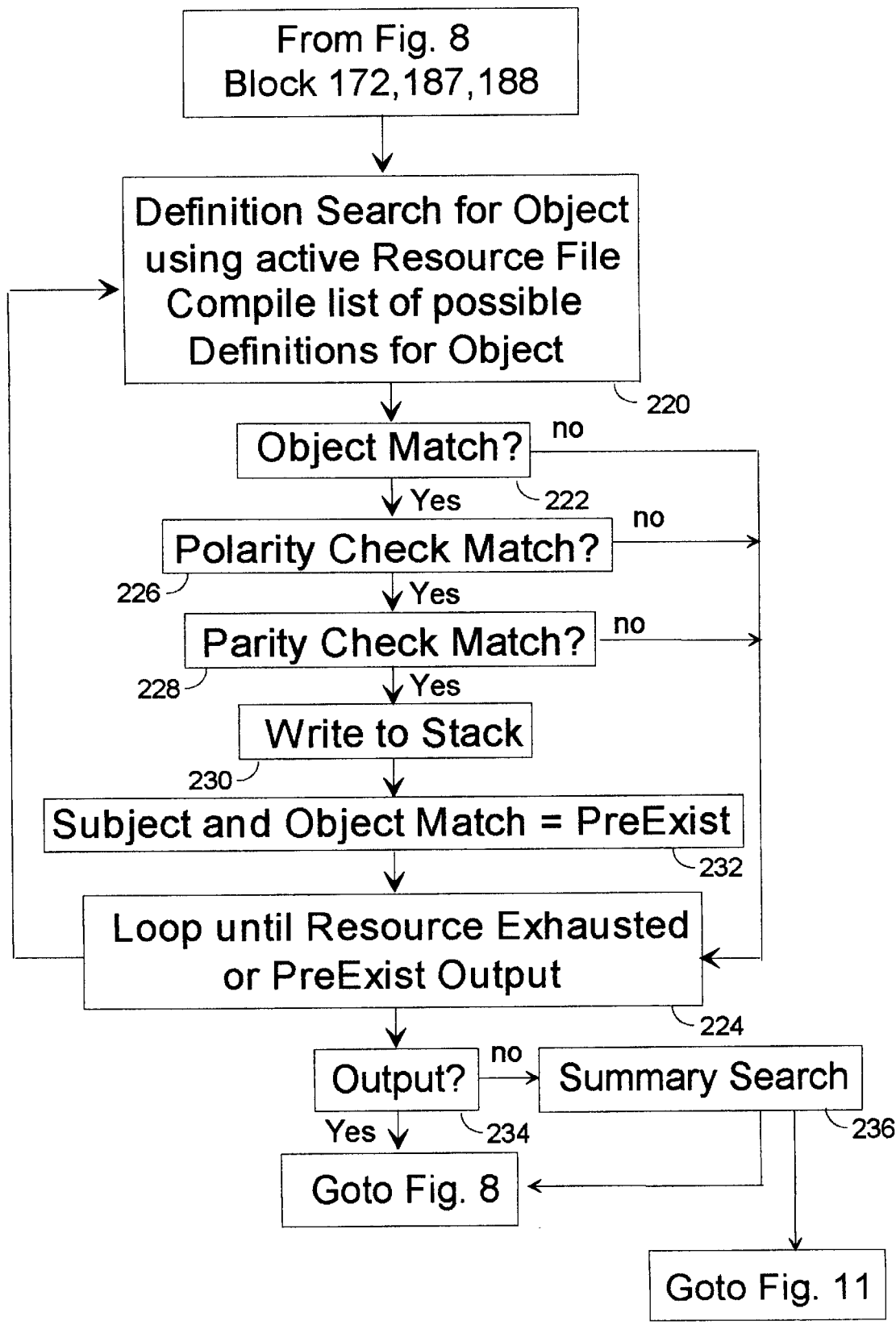

Referring now to FIG. 8, the subject OK module, if a subject was detected from block 150 (FIG. 7), a determination is made at block 172 as to whether a question has been detected. If no question has been recognized, although a subject has been identified, a decision is made at numeric input detected block 174, to determined if the sentence is numeric input. If the sentence is a number, the number will be appended to a file via alarm or interrupt block 176 and append file block 178. The detection of a number may relate to system time which actuates the alarm or interrupt at block 176. If a question was detected at block 172, the system flows to the engine module (FIG. 10). After the function of the engine module is performed, a determination is made at block 180 to determine if an interrupt occurred. If an interrupt occurred, a reset is performed at block 182.

Figure 9:
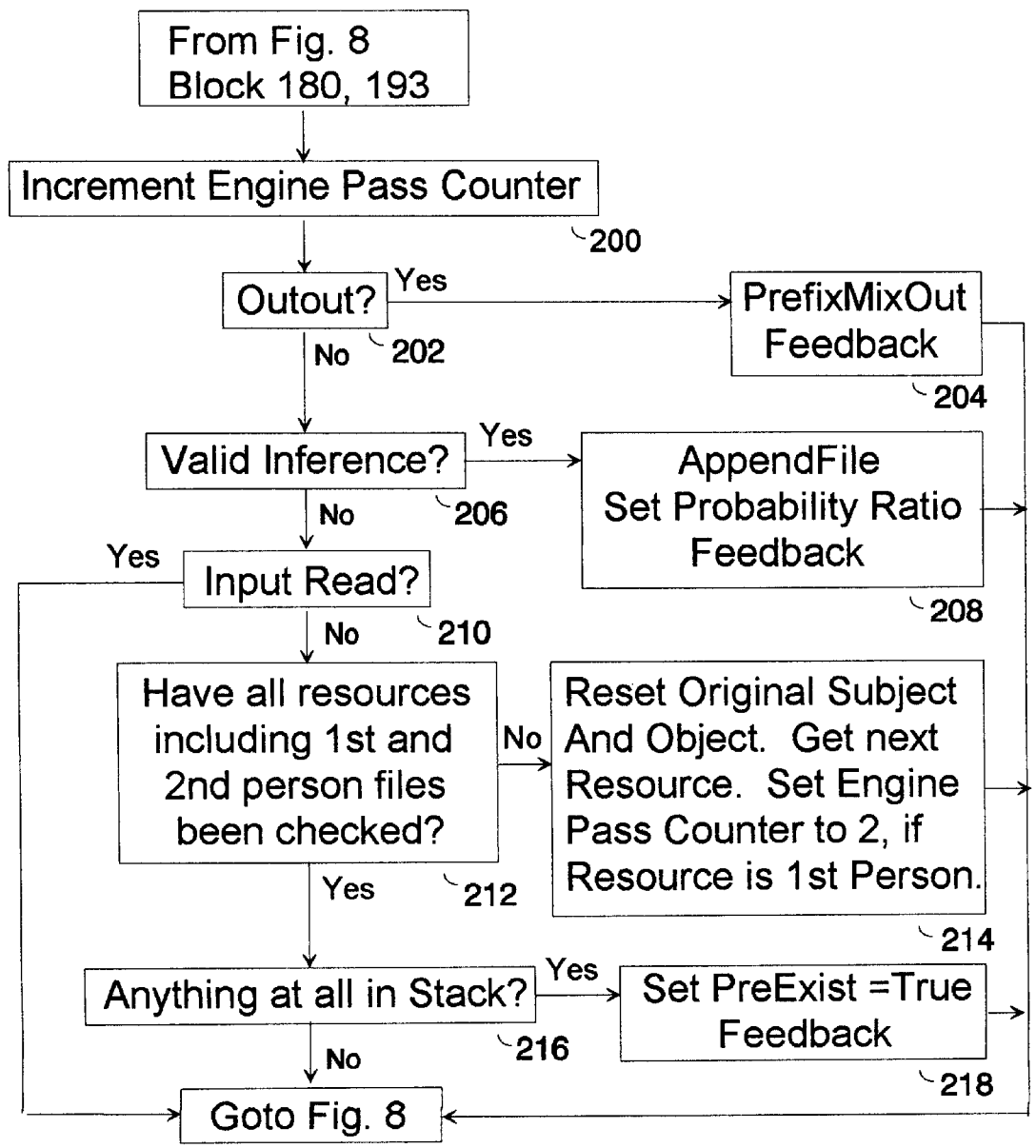

Assuming no interrupt has occurred, while the system was performing the functions at the engine module, the system proceeds to the latch module (FIG. 9). The latch module handles the validity of the inference made by the engine. The latch operates to either hold information or pass the information that is generated by the engine module. Assuming the information is passed by the latch module, a determination is made whether the information has made a first pass through the engine at block 184. The latch is set so that if the information passes through the latch a second time, the flow will return to the idle module (FIG. 1). Otherwise, the information will pass through the engine module (FIG. 10) a second time.

If no numeric input was detected at block 174, a decision is made at block 186 to determine whether the original register contains less than three words. If there are only two words in the original register, it is concluded that the instruction is not a question. The two word or below will be converted to a global question at block 188 and the system proceeds to engine module (FIG. 10). Assuming that the register contains more than three words, a comment is made at block 187 by the interface system to the user. The system then proceeds to the engine module, FIG. 10.

After the input is processed by the engine module (FIG. 10), a determination is made at block 190 to determine whether an interrupt or input read occurred while the engine module was processing. If yes, the subject OK module returns to the idle module (FIG. 1). If no interrupt occurred, the interface system determines whether a comment should be made at block 191. If a comment is required, a check is made to indicate if the output was duplicative at block 192. If the comment was duplicate, the system returns to the idle module (FIG. 1). If no comment was required, a decision is made at block 193 that there is no subject and the system dumps the contents of the register to no command module (FIG. 7) at block 194. If the decision at block 193 is no, the program proceeds to latch module (FIG. 9) and upon completion of latch module (FIG. 9) operations, the program returns to idle module (FIG. 1).

Referring now to FIG. 9, the latch module is a part of the subject OK module (FIG. 8). Latch module is entered from blocks 180 and 193 from FIG. 8. At block 200, the engine pass counter is incremented. A decision is then made at block 202 to determine if there has been an output from the engine module at this point in the latch. If there is an output, a preexisting condition has occurred, and the module will be exited at this point to the prefix output feedback at block 204. The program will then return to FIG. 8 at the point where the latch module was requested. Block 204 adds a prefix to the information that was located on the first pass through the engine module (FIG. 10). If there was no output at block 202, a determination will be made as to whether there is a valid inference at block 206. A valid inference means whether the question is of an equality type or an inference produced in the first pass through the engine. If the inference has been produced and it is a valid inference, then the information will be appended to a file and a probability ratio feedback will be assigned to block 208. The probability ratio indicates how many references were required in order to make the valid inference. The output of block 208 completes the operation of latch module 9 and the program returns to FIG. 8.

If no valid inference was made at block 206, an inquiry is made to read the input at block 210. This inquiry is made to determine if enough information has been found in order to produce an output. If there is sufficient information, the latch module returns to the subject OK module (FIG. 8). If there is not enough information at block 210, a decision is made at block 212 to determine if all resources have been checked. These resources include the first and second person files. If all resources have not been checked, the original subject and object are reset at block 214, the next resource is checked and the pass engine counter is set to 2 if the resource is a first person. The latch module will then return to FIG. 8.

If the decision at block 212 is yes, a determination will be made to determine to locate any information in the stack at block 216. If information exists in the stack, the pre-existing condition is set to true at block 218 and the latch module returns to FIG. 8. If no information is available in the stack, the latch module returns to FIG. 8.

Referring now to FIG. 10, the engine module, which is entered from box 172, 187, or 188 from FIG. 8, first searches for an object using active resource file to compile a list of possible definitions for object at block 220. A decision is then made at block 222 to determine if there is an object match. If no object match is found, the engine module continues to loop until all resources are exhausted or a pre-existing condition output is found at block 224. The resources utilized by the engine are designated by the user specifically or within the user's personal library.

If an object is found at block 222, a polarity check is made at block 226. The polarity check is either a positive or a negative determination of the match. If the polarity check does not occur, the system returns to block 224. If the polarity check is positive, a parity check is made at block 228. The parity relates to the number of words in the object being searched for. After the parity has been checked at block 228, and all resources have been checked for the object, the object will be written to stack at block 230. A check will then be made at block 232 to determine if the subject and object match. If a match exists, and no pre-existing conditions or inferences are required, the pre-existing switch will be set at block 232. With the pre-existing switch set, the engine module is exited via block 224. The output of the engine module at block 234 will be sent to FIG. 8 at the point in the program of FIG. 8 that the engine module was requested. If no object has been found, and the resources have been exhausted, a summary search is made at block 236 to call the summary module (FIG. 11). After the summary module function is complete, the flow returns to FIG. 8.

Referring now to FIG. 11, the summary module is entered from summary search block 236 of FIG. 10. Summary search module functions to search for alternate objects since the interface system has been unable to produce an output. The interface system looks for a definition of the object at block 238. If a global request is detected at block 240, the global module is entered at block 242 (FIG. 12). If the request is not global, the equity module is entered at block 244 (FIG. 13). After completion of either the global or equity modules operation, both these modules return to the summary module to block 246. The summary module continues until all resources are exhausted or a pre-existing switch is set. At the completion of the summary search module's operation, the program returns to FIG. 10, block 236.

Referring now to FIG. 12, the global module, is called from block 240 (FIG. 11). A decision is made at block 248 to determine if the subject and object match. If no subject and object match, the global module returns to FIG. 11. If a match occurs, a polarity check is made at block 250. If the polarity check matches, a parity check is made at block 252. If the parity check matches, an additional determination is made whether the subject and object match at block 254. If the subject and object match at block 254, the global filters are activated at block 256. These filters include the who, what, when, where, or why categories. If either parity, polarity, or subject and object do not match, the global module returns to FIG. 11.

After filter activation, the information is placed into a memo log at block 258. Input into the memo log allows the interface system to activate alarms at the appropriate time. The information stored in the memo log is output at block 260 representing the output from FIG. 2. The output is then written to the stack at block 262. The program returns to FIG. 11.

Referring now to FIG. 13, the equity module is entered from block 240 (FIG. 11) and a determination is made at block 264 to determine whether the subject and object match. If no match is found, the equality module returns to FIG. 11. If the subject and object match, a polarity check is made at block 266 and a parity check is made at block 268. If both polarity and parity match, the information is written to the stack at block 270. The question is then asked at block 274 at to whether the subject and the alternatives object match or, has a valid association been made. If so the creation switch is set and the pre-existing switch is ignored. If the subject and object match, the pre-existing switch is set at block 276, and the equality module returns to FIG. 11. The pre-existing condition takes precedence over a created condition.

Figure 14:
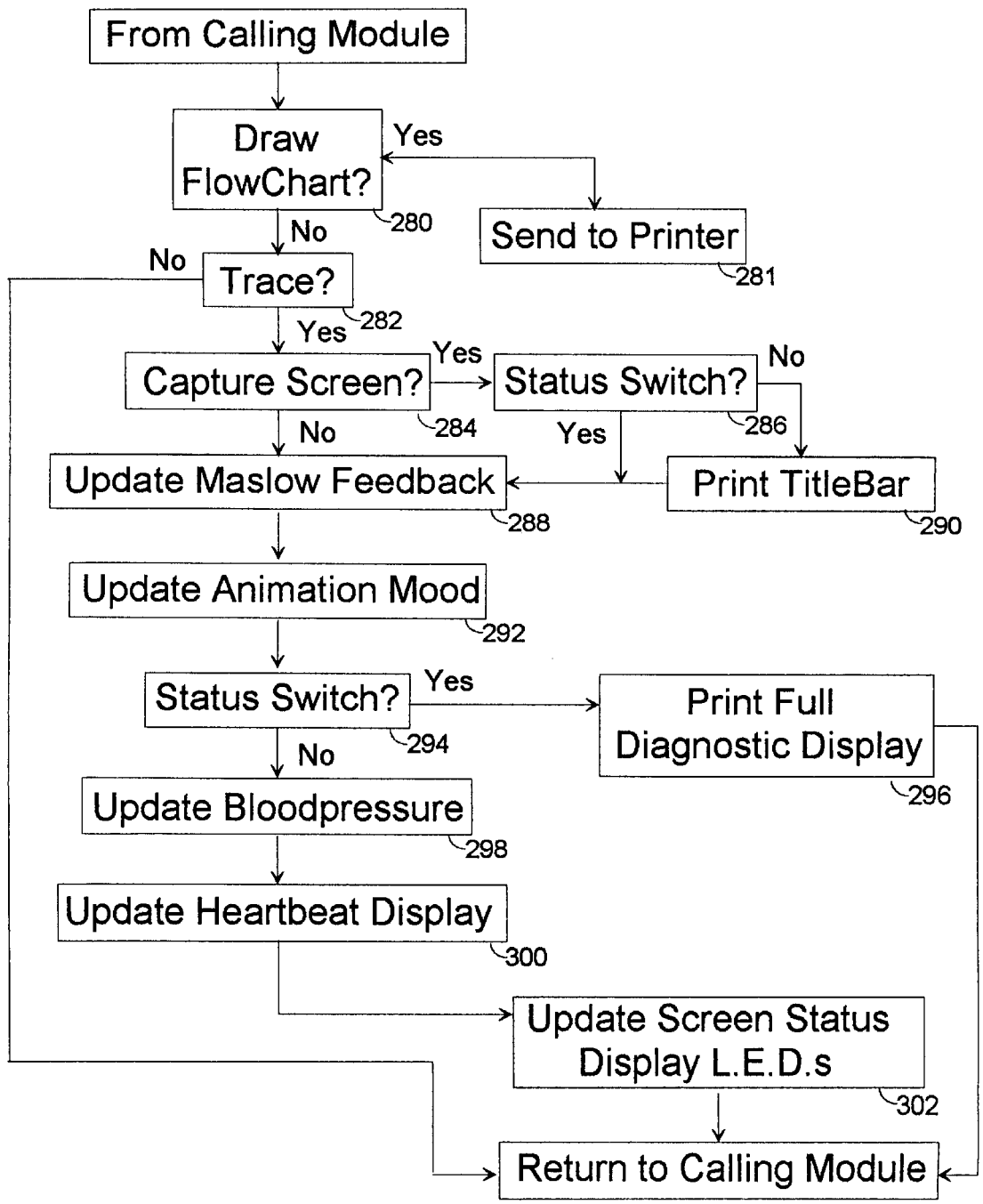

Referring now to FIG. 14, the trace module can be called from any of the previously described modules (FIGS. 1–13). At block 280, a flow chart is drawn to chart out the system as the system operates to provide a readout of each module as a module is entered and completed based upon the dock time and the elapsed time when the trace module is called. The flow chart shows the subject and object entering into the module and the subject and object as they have been modified exiting a module. The flow chart is sent to a printer at block 281. If no trace is requested at block 282, the trace module returns to the calling module. If a trace is requested at block 282, a decision is made as to whether the user desired to capture the screen in order to display a full trace of activity or only a display of a partial trace. If a full screen is to be captured, a determination is made at block 286 as to whether a status switch has been set. If no status switch is set, a title bar will be printed on the display via block 290. If the status switch is set, no title bar will be displayed. At block 288, a Maslow feedback is updated. At block 292, the interface system animation mood is updated.

At block 294, a determination is made as to the status of a status switch if a full diagnostic display is to be displayed, a full printout will be made of the entire system at block 296. The trace module then returns to the calling module. If the status switch at block 294 is not set, update blood pressure occurs at block 298 relating to the "mood" of the interface system. Similarly, heart beat update is displayed at block 300. Screen status display LEDs are updated at block 302. The trace module then returns to the calling module.

Figure 15:
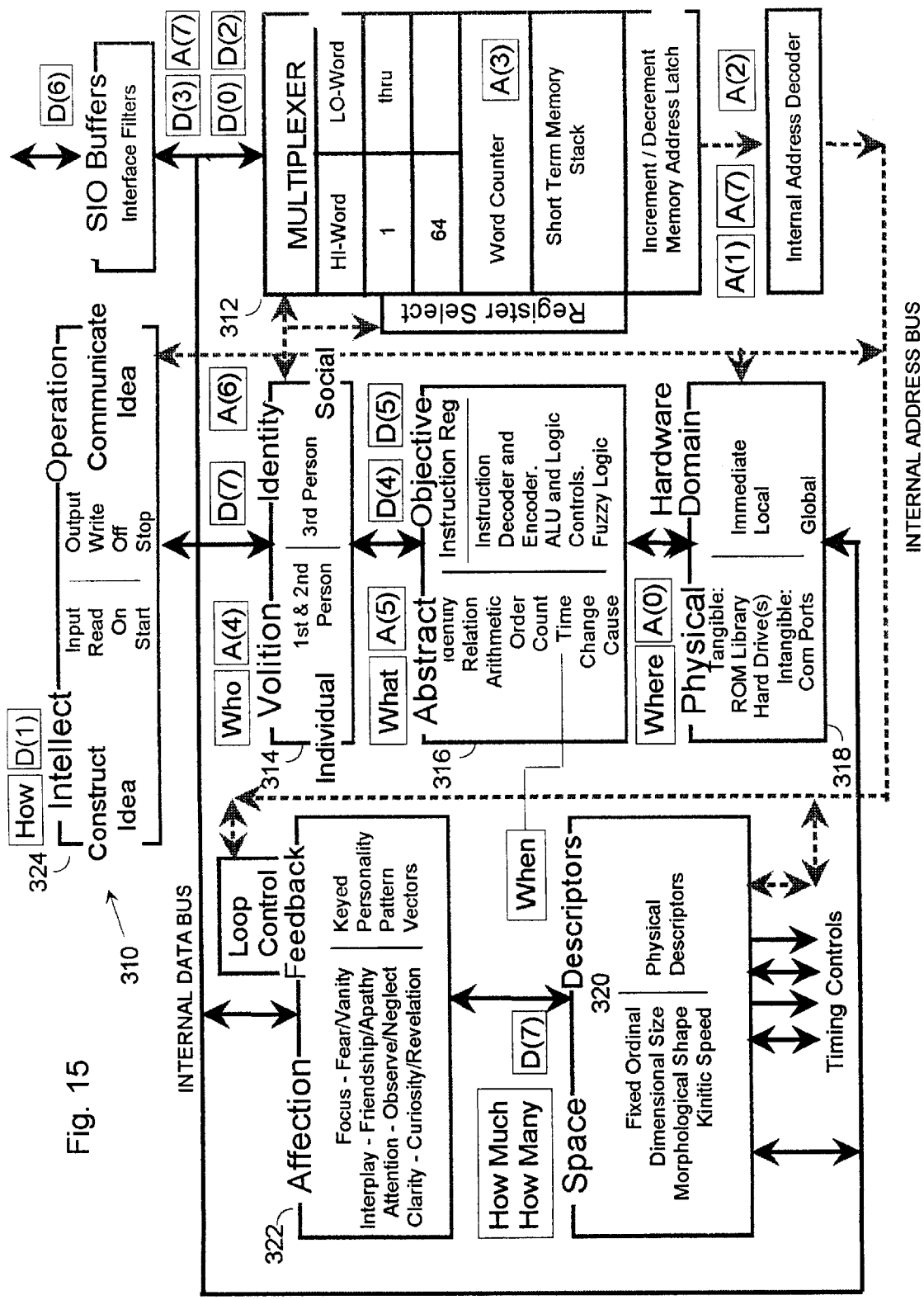
FIG. 15 is an electronic block diagram of the present interface system.

Referring now to FIG. 15, a block diagram of the present interface system for use with a central processing unit is illustrated and is generally identified by the numeral 310. Central processing unit 310 includes a multiplexer 312 which includes the read and write registers associated with input/register write module of FIG. 3 and register read module of FIG. 5. Block 314, volition identify relates to the identity of the first person, second person, or third person aspect of the present interface system. This information is provided on an internal data bus which is calling for these particular resources. At any incident in time, the resources which are being evaluated on the data bus will be one of these three persons. Block 314 comprises, for example, a read only memory. Block 316 represents abstract and objectives which represents arithmetic logic units and instruction commands associated with fetch module (FIG. 6). Block 316 includes subroutines for addition, subtraction, multiplication, and division. Block 316 also includes command files associated with fetch module (FIG. 6). Block 316 functions to decode user input as input is applied to multiplexer 312.

Block 318 represents the physical hardware domain and may comprise, for example, a ROM library and hard drive, or a communications port. Block 318 stores the resources previously identified with respect to FIGS. 1–14.

Block 320 relates to space descriptors for changing the size of various files within the present interface system. Block 320 relates to FIGS. 3 and 6. Block 322 relates to the present interface system human characteristics, such as mood and the feedback which occurs throughout the system with respect to FIG. 14. Block 324 relates to user input and system output.

Figure 16:
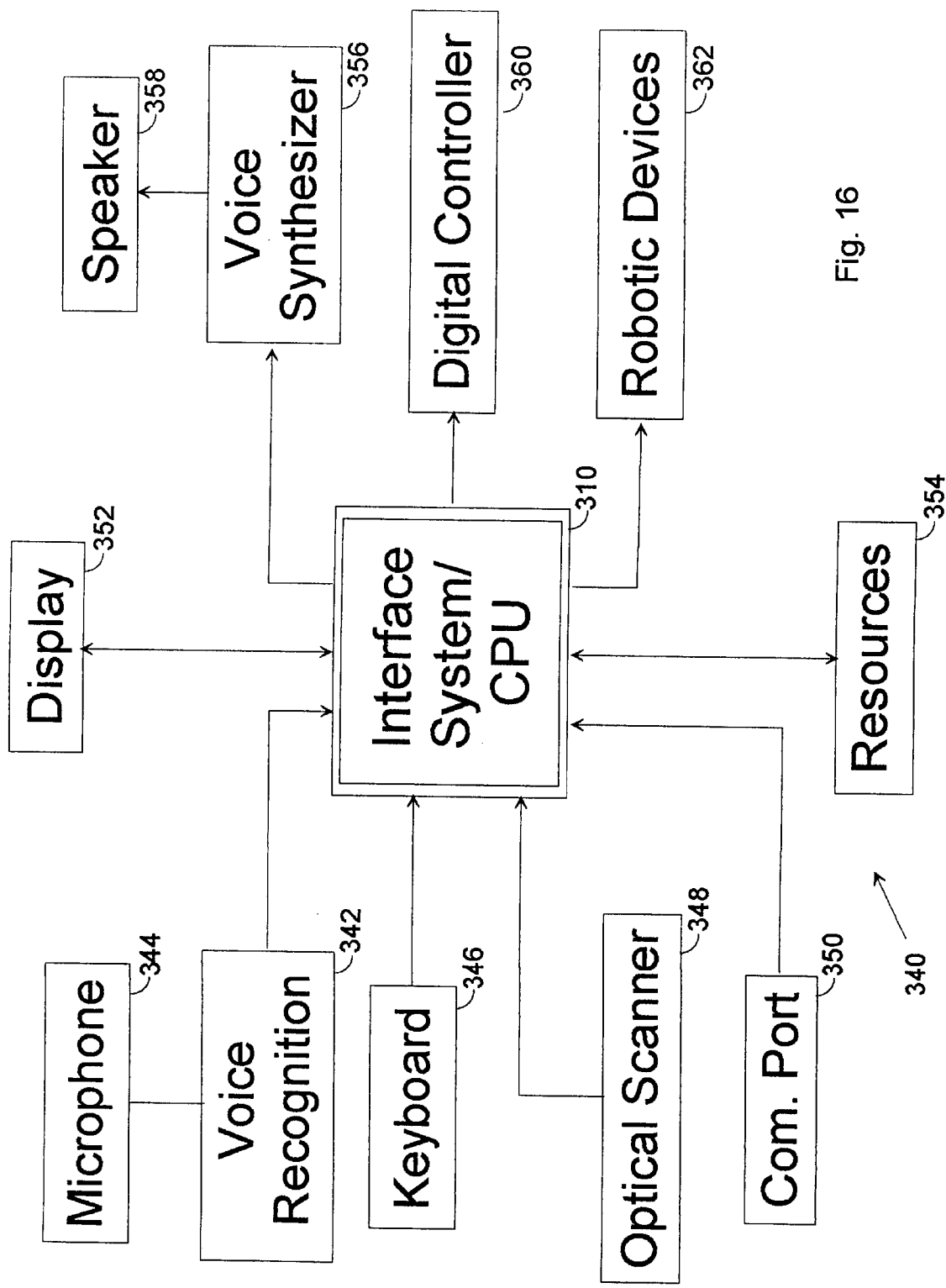
FIG. 16 is a block diagram of a data processing system using the present interface system.

Referring now to FIG. 16, a block diagram of a computer controlled system is illustrated, and is generally identified by the numeral 340. System 340 includes interface system/CPU 310 of the present invention. Various input devices as previously described for the present interface system 310 include a voice recognition device 342 receiving input from a microphone 344, a keyboard 346, an optical scanner 348, and a communications port 350. Input devices 342, 346, 348, and 350 represent user input 64 (FIG. 2). Associated with interface system/CPU 310 is a display 352 which includes screen 82 (FIG. 2) and screen 302 (FIG. 14). Resources 354 provide a data base for interface system/CPU 310. Interface system/CPU 310 generates various outputs, for example, voice via a voice synthesizer 356 and speaker 358, digital data for a digital controller 360, and data for operation of robotic devices 362.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A system for interfacing a human user to a data processor, the data processor receiving inputs from the user and includes associated stored resource information, and which generates outputs to the user and associated output devices, the system comprising:

means for receiving a statement generated by the human user in natural language on a word-by-word basis;

means for analyzing the statement to identify a subject;

means for searching the stored resource information for data related to said identified subject;

means for providing to the users data from the stored resource information related to the identified subject;

means for determining a mood of a user from the statements generated by the user and for creating a human-like response; and means for providing an output to the user, the output being responsive to the user based upon an analysis of the data from the stored resource information to provide an answer to the user, thereby providing new data to the user which is not directly stored in the resource information.

2. The system of claim 1 wherein said analyzing means reformats statements presented in the form of questions into statements in the form of a sentence.

3. The system of claim 1 wherein said analyzing means identifies key words based on pre-stored words in the stored resource information.

4. The system of claim 1 wherein said searching means includes:

a first storage area for storing resources associated with the user;

a second storage area for storing resources associated with the system; and a third storage area for storing resources external to the system.

5. A method for interfacing a human user to a data processor, the data processor receiving inputs from the user and includes associated stored resource information, and which generates outputs to the user and associated output devices, the method comprising the steps of:

receiving a statement generated by the human user in natural language on a word-by-word basis;

analyzing the statement to identify a subject;

searching the stored resource information for data related to the identified subject;

providing to the user, data from the stored resource information related to the identified subject;

means for determining a mood of a user from the statements generated by the user and for creating a human-like response; and generating an output to the user, the output being responsive to the user based upon an analysis of the data from the stored resource information to provide an answer to the user, thereby providing new data to the user which is not directly stored in the resource information.

6. The method of claim 5 wherein the step of searching includes:

searching a first storage area for storing resources associated with the user;

searching a second storage area for storing resources associated with the system; and searching a third storage area for storing resources external to the system.

7. The method of claim 6 wherein the step of analyzing includes reformatting statements presented in the form of questions into statements in the form of a sentence.

8. The method of claim 6 wherein the step of analyzing includes identifying key words based on pre-stored words in the stored resource information.

* * * * *

UNITED STATES PATENT AND TRADEMARK OFFICE
CERTIFICATE OF CORRECTION

PATENT NO : 5,855,002
DATED : December 29, 1998
INVENTOR(S) : Alan A. Armstrong

It is certified that error appears in the above-identified patent and that said Letters Patent is hereby corrected as shown below:

Column 4, line 21, change "thinly" to --think,-- and

Column 10, line 50, change "dock" to --clock--.

IN THE CLAIMS

Claim 1, Column 12, line 4, change " users" to --user,--;

Claim 7, Column 12, line 60, change "6" to --5--; and

Claim 8, Column 12, line 63, change "6" to --5--

Signed and Sealed this

Eleventh Day of May, 1999

Attest:

Q. TODD DICKINSON

Attesting Officer

Acting Commissioner of Patents and Trademarks